(12) United States Patent
Freimann et al.

(10) Patent No.: US 6,799,328 B1
(45) Date of Patent: Sep. 28, 2004

(54) DYNAMIC EVENT INFORMATION TABLE SCHEDULE WINDOW

(75) Inventors: Felix Freimann, Sunnyvale, CA (US); Jino Nguyen, Mountain View, CA (US); Jean-Rene Menand, Palo Alto, CA (US)

(73) Assignee: OpenTV, Inc., San Francisco, CA (US)

( * ) Notice: Subject to any disclaimer, the term of this patent is extended or adjusted under 35 U.S.C. 154(b) by 0 days.

(21) Appl. No.: 09/447,334

(22) Filed: Nov. 22, 1999

Related U.S. Application Data

(60) Provisional application No. 60/109,918, filed on Nov. 23, 1998.

(51) Int. Cl.[7] ............................ G06F 3/00; G06F 13/00; H04N 5/445
(52) U.S. Cl. .......................................... 725/44; 725/43
(58) Field of Search ............................. 725/39, 40, 43, 725/44, 46, 45, 47, 53, 55; 348/563, 564, 588; H04N 5/445; G06F 3/00, 13/00

(56) References Cited

U.S. PATENT DOCUMENTS

| | | | |
|---|---|---|---|
| 5,589,892 A | 12/1996 | Knee et al. ................. 348/731 |
| 5,592,551 A | 1/1997 | Lett et al. ..................... 380/20 |
| 5,596,373 A | 1/1997 | White et al. ................ 348/569 |
| 5,635,978 A | 6/1997 | Alten et al. ..................... 348/7 |
| 5,841,433 A | * 11/1998 | Chaney ........................ 725/50 |
| 5,929,932 A | * 7/1999 | Otsuki et al. ................. 725/47 |
| 6,111,612 A | * 8/2000 | Ozkan et al. ............... 725/137 |
| 6,160,545 A | * 12/2000 | Eyer et al. .................. 345/721 |
| 6,216,265 B1 | * 4/2001 | Roop et al. ................... 725/54 |

\* cited by examiner

*Primary Examiner*—Vivek Srivastava
(74) *Attorney, Agent, or Firm*—Meyertons Hood Kivlin Kowert & Goetzel, P.C.; Rory D. Rankin

(57) ABSTRACT

A method for acquiring and storing schedule event information in an interactive television system. The schedule event information includes events and a start time and date for each of the events. The method includes creating a window defined by a start time and date and an end time and date and receiving the schedule event information at a receiving station. The schedule event information is stored for events having a start time and date within the window. The method further includes automatically moving the window forward relative to the start time and date at a specified interval such that the end time and date of the window are always after a current time and date. A system for acquiring and storing schedule event information is also disclosed.

20 Claims, 9 Drawing Sheets

DYNAMIC EVENT INFORMATION TABLE SCHEDULE WINDOW

RELATED APPLICATION

The present application claims the benefit of U.S. Provisional Application No. 60/109,918, filed Nov. 23, 1998.

BACKGROUND OF THE INVENTION

The present invention relates generally to interactive television systems, and more particularly, to the acquisition, processing, and storing of schedule event information tables.

Interactive television systems are capable of displaying text and graphic images in addition to typical video program streams and provide a number of services and interactive applications to viewers. Generally, a broadcast service provider generates an interactive television signal for transmission to a viewer's television. The interactive television signal includes an interactive portion consisting of application code or system information, as well as an audio-video portion consisting of a television program. The broadcast service provider combines the audio-video and interactive portions into a single signal for transmission to a receiver connected to the viewer's television. The signal is generally compressed prior to transmission and transmitted through typical broadcast channels, such as cable television (CATV) lines or direct satellite transmission systems.

A set top box connected to the television controls the interactive functionality of the television. The set top box receives the signal transmitted by the broadcast service provider, separates the interactive portion from the audio-video portion, and decompresses the respective portions of the signal. The set top box uses the interactive information to execute an application while the audio-video information (after processing) is transmitted to the television, for example. The set top box may combine the audio-video information with interactive graphics or audio generated by the interactive application prior to transmitting the information to the television. The interactive graphics and audio may present additional information to the viewer or may prompt the viewer for input. The set top box may provide viewer input or other information to the broadcast service provider via a modem connection.

The video, audio, and system information may be sent from a head end in various blocks of data via various transport mediums. For example, they may be sent from the head end via cable or satellite to the set top box. An example of the contents of such system information includes information regarding present or future events, services which the user of the set top box may access, and the current time and date. Examples of events include a television program (e.g., news, movie, sports), while an example of services includes a set of channels broadcast by the network (head end). Information on events is contained within an Event Information Table (EIT). This information is typically transferred from the head end to the set top box in EIT sections. These EIT tables are continuously re-broadcast by the head end due to the fact that the head end does not know when a set-top box is powered on. Information on events scheduled to appear on various services may be requested by the viewer. However, due to bandwidth limitations the re-broadcast typically starts every 20–30 seconds. Hence, the time it takes for this information to be gathered, processed, and displayed on a television set may be significant due to the cycle time of the data delivered to the set top box.

There is, therefore, a need for a system and method for storing schedule event information and continuously updating it, along with discarding information for past events and storing information for future events so that a viewer can quickly access the schedule information.

SUMMARY OF THE INVENTION

A system and method for acquiring and storing schedule event information in an interactive television system is disclosed. The schedule event information for each event may include, for example, the event start time and date, its duration and additional event description.

A method of the present invention generally includes creating a window defined by a start time and date and duration. The schedule event information is stored for events having a start time and date within the window. The method further includes automatically moving the window forward relative to the start time and date at a specified interval. The window may be further defined by a list of services.

A system of the present invention generally includes a processor for creating a window defined by a start time and date and a duration and a memory device for storing schedule event information for events having a start time and date within the window. The processor is operable to move the window forward relative to the start time and date at a specified interval.

In another aspect of the invention, a computer program product generally includes computer code that creates a window defined by a start time and date and a duration and computer code that stores the schedule event information for events having a start time and date within the window. The product further includes a computer code that automatically moves the window forward relative to the start time and date at a specified interval and a computer readable medium that stores the computer code. The processor is also operable to modify the window to change the start time and date.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the present invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
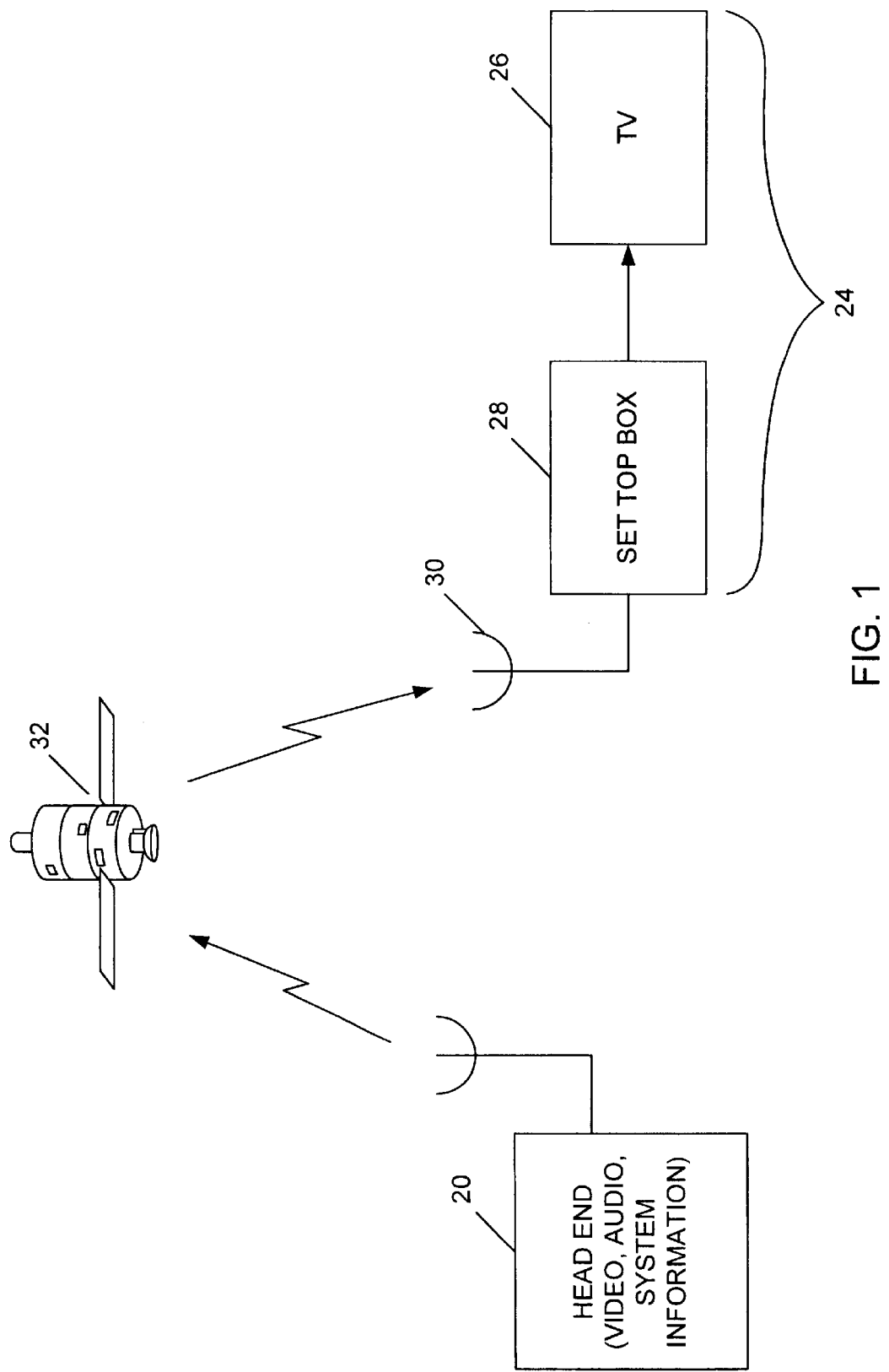
FIG. 1 is a diagram illustrating the distribution of interactive television applications, television programs, and system information from a source to a receiving station.

FIG. 1 is a diagram illustrating the distribution of interactive television applications, television programs (audio and video) and system information (e.g., number of services, service names, event names, event schedules) from a source to a viewer. The system includes a head end 20, which may be coupled with a video and audio device (not shown) that feeds a particular video with associated audio to the head end. The audio-video-interactive signal contains television programs or similar audio-video content, as well as interactive content such as control signals, system information, and interactive applications. The video information may be digitized at the head end 20 and transmitted via a transmitter to a receiving system 24. The information transmitted by the head end 20 may be transmitted to the receiving system 24 in various ways. For example, the transmitted information may be sent to the receiving system 24 via a broadcast signal such as a satellite transmission. The receiving station 24 may also be configured to receive signals via a modem channel or cable. The receiving system 24 may include, for example, a television 26 connected to a set top box 28. The set top box 28 may include a receiving antenna 30 for receiving information from a satellite 32. The receiving station antenna 30 passes the interactive television signal to the set top box 28, which performs the processing functions of the receiving station 24. Once information is received through the receiving antenna 30, it may be processed by the set top box 28 and displayed on the television set 26. In this manner, audio, video, and interactive data may be received and processed by the set top box 28. The signals transmitted via the broadcast or modem channels may embody various modules which comprise components of an interactive application. The modules may contain any type of data, such as application code, raw data, or graphical information.

System information provided to the set top box 28 includes a list of services (e.g., CNN, MTV, ESPN) available to a viewer, event names (e.g., Dateline, Star Trek), and a schedule of the events (start time/date and duration). This information is provided in an Event Information Table (EIT) Schedule. The EIT-Schedule data is provided by the head end 20 and transmitted to the set top box 28. The set top box 28 includes an EIT-Schedule module which acquires, processes, and stores EIT-Schedule information for a specified period of time so that a viewer can quickly access and display a selected portion of the EIT-Schedule. Before a viewer can request EIT-Schedule event information, preferably, the viewer has to create an EIT-Schedule window 40 into which schedule events fall (FIG. 2).

Figure 2:
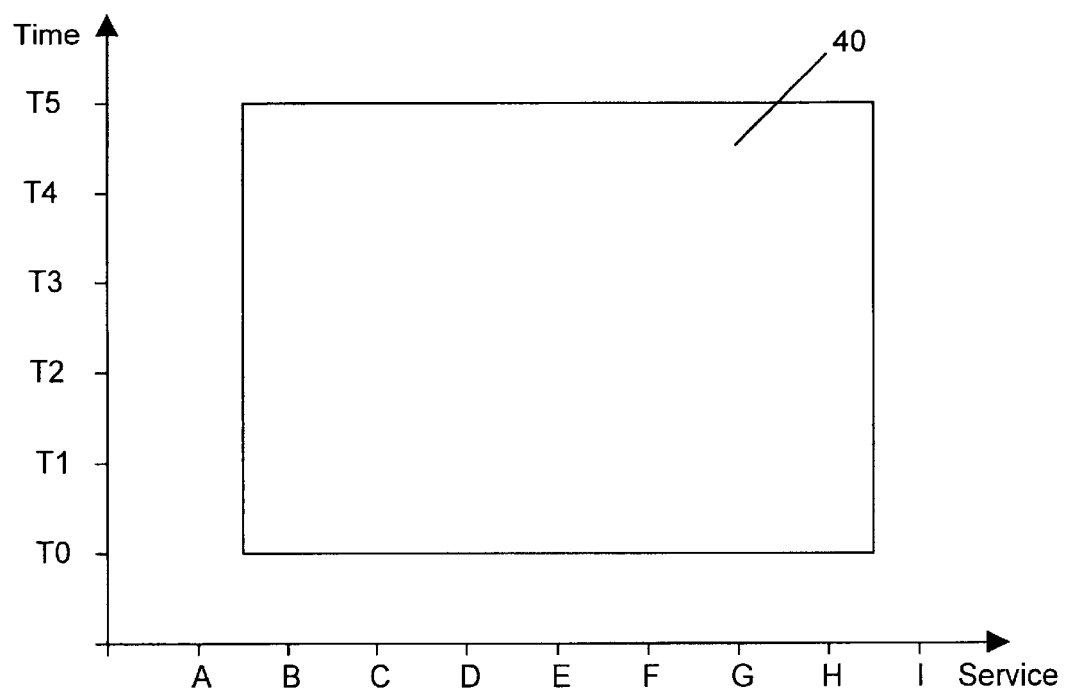
FIG. 2 is a graph illustrating an EIT-Schedule window created by an EIT-Schedule module.

The EIT-Schedule window 40 is defined for selected services over a specified period of time (FIG. 2). As shown in FIG. 2, a horizontal axis of the graph includes a list of services (A-I) and a vertical axis lists times and dates (T0-T5). EIT-Schedule events which belong to a service that is part of the EIT-Schedule window 40 and fall within the time range of the window will be processed and stored in the set top box 28. For example, a schedule event will be accepted as being within the EIT-Schedule window 40 if all of the following apply: the event belongs to a service which is part of the list of services for the window; the event's start time/date and duration fall within the window's start time/date and duration; and the event passes successfully to a content discriminator (described below) used to further filter the data. The duration of an event can be used to determine the end time/date of the event, or an event end time/date may be provided in place of the duration. In the following description, either the end/time date or duration may be used and both are interchangeable with one another.

Figure 3:
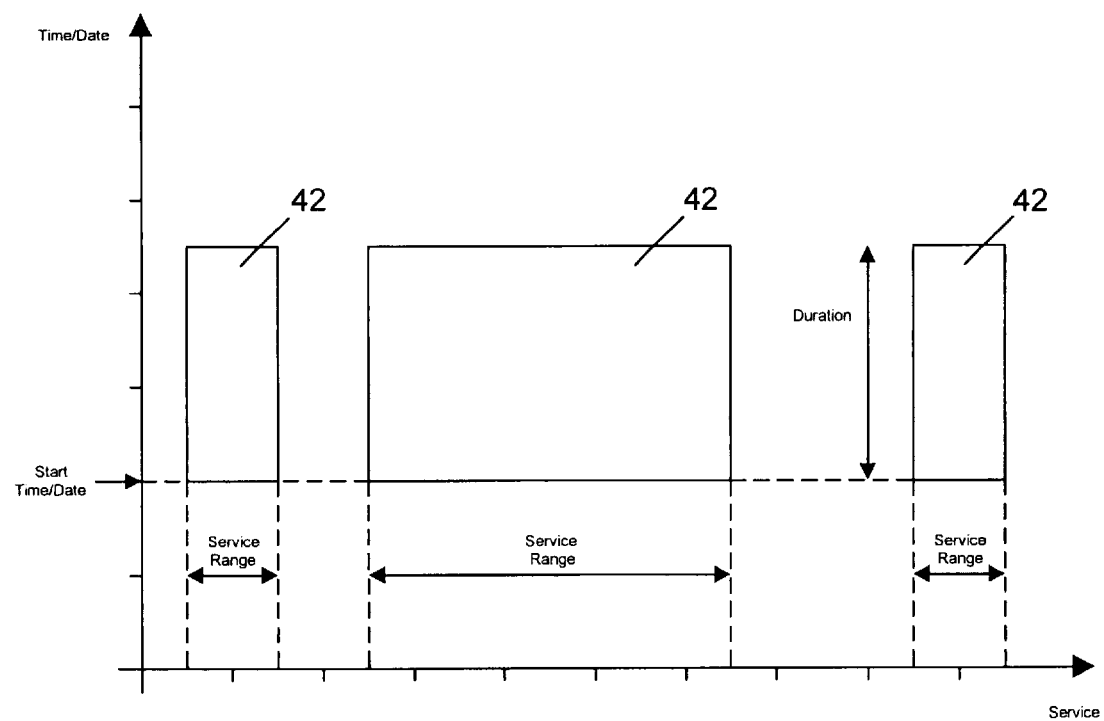
FIG. 3 is a graph illustrating an EIT-Schedule window comprised of non-consecutive service ranges.
Figure 4:
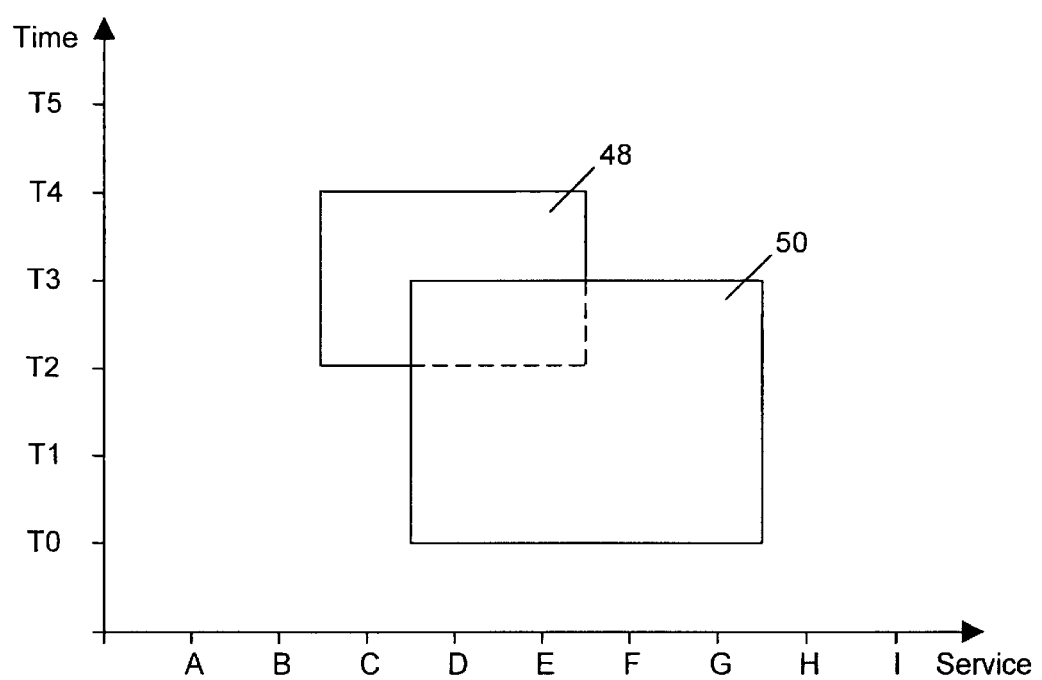
FIG. 4 is a graph illustrating partial overlapping EIT-Schedule windows.
Figure 5:
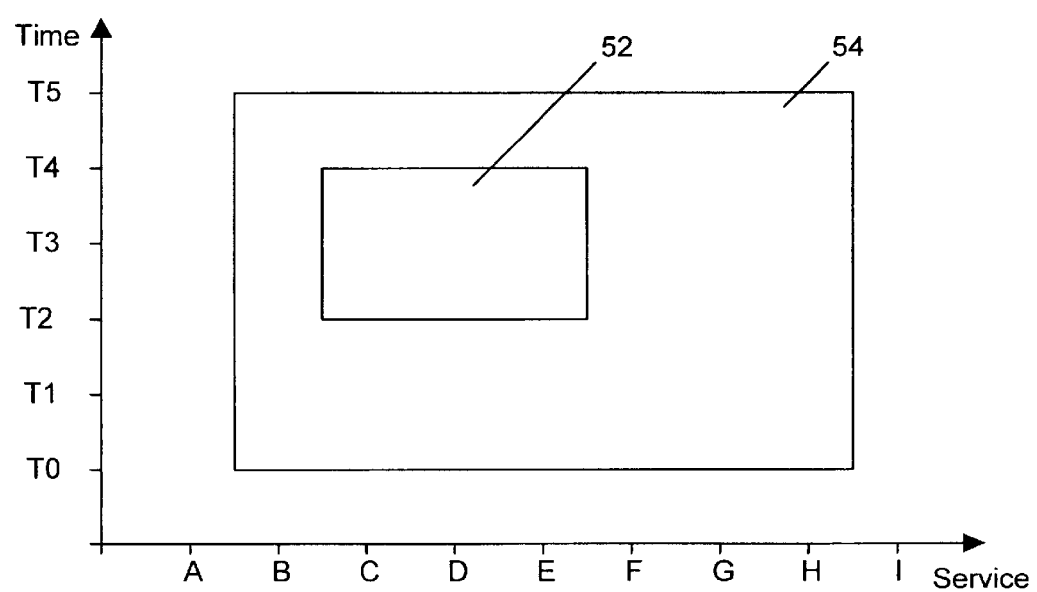
FIG. 5 is a graph illustrating two fully overlapping EIT-Schedule windows.
Figure 6:
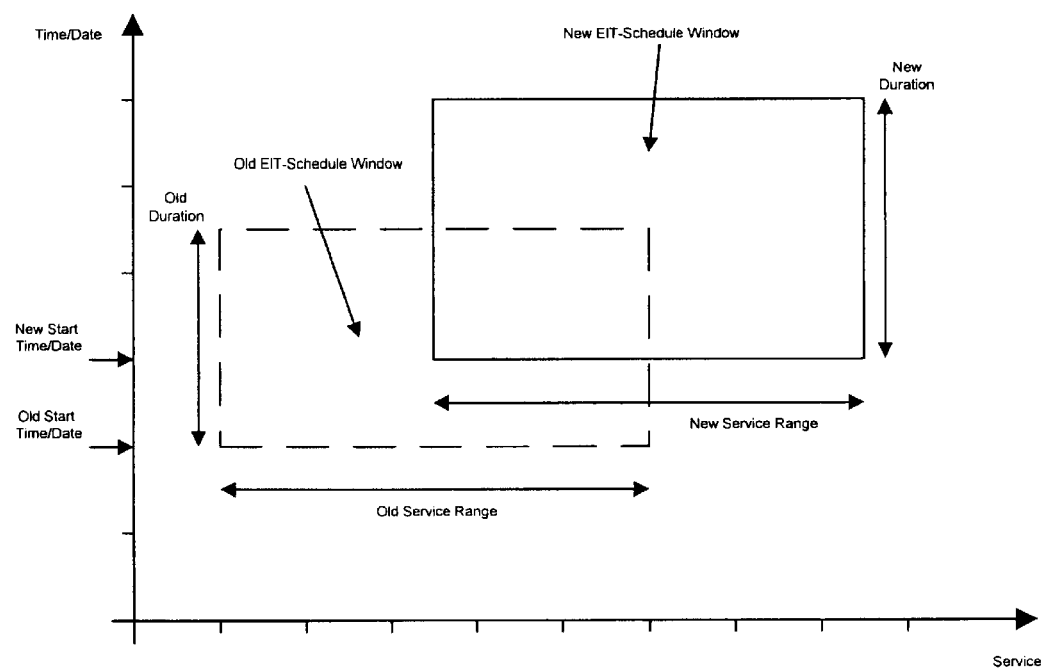
FIG. 6 is a graph illustrating the moving of an EIT-Schedule window.

A viewer may define multiple EIT-Schedule windows for which a schedule module will acquire and store the EIT-Schedule events. The window may also be created by an application running in the set top box 28. As shown in FIG. 3, the monitored list of services do not need to be consecutive (i.e., in the order the services are located in the event information table). However, the monitor window start time/date and duration applies to all services assigned to an EIT-Schedule window. The three blocks 42 shown in FIG. 3 make up one EIT-Schedule window. FIG. 4 illustrates an example of two EIT-Schedule windows 48, 50 which partially overlap one another. Two EIT-Schedule windows may also be created such that one window 52 is completely contained within another window 54 (FIG. 5). The EIT-Schedule module may also be used to modify an EIT-Schedule window after it has been defined by a viewer, by adding or removing services or modifying the start time/date and duration as shown in FIG. 6. A viewer may also delete an entire EIT-Schedule window.

Whenever the UTC (Universal Time, Coordinated) or GMT (Greenwich Mean Time) date rolls forward on the set top box 28, all EIT-Schedule events which identify events scheduled for the previous GMT date, are removed from the data stream. If the window is not moved forward in time, it will eventually become empty. Thus, when an application or viewer creates an EIT-Schedule window, the application or viewer should also define an automatic window time advance by which the created EIT-Schedule window will automatically shift forward in time. This feature will ensure that the EIT-Schedule window will follow the GMT date roll over. Once the EIT-Schedule window is defined, the start time/date and duration is automatically updated by the EIT-Schedule module so that the window is continuously moved forward to stay in sync with the current GMT time/date. The start time will be incremented, for example, when the difference between the current set top box's time/date and the time/date when the viewer defined the EIT-Schedule window exceeds a specified update time interval. The update time interval may be in multiples of three hours, for example, since this is the duration of a Digital Video Broadcasting (DVB) EIT schedule segment.

After the EIT-Schedule module has created an EIT-Schedule window it will return a handle to the user which uniquely identifies the window within the EIT-Schedule module. An application or user will not be able to extract EIT-Schedule information until a handle has been created for the window. In addition to creating a handle for the window, a handle will be created for each event within the EIT-Schedule window. If the user releases a handle to a schedule event, the event will not be discarded as long as it still falls within at least one EIT-Schedule window. Once the application or user has created a handle to an EIT-Schedule event, it will receive a notification if the EIT-Schedule event changes. For example, the user may receive a notification if an EIT-Schedule event is no longer available (e.g., falls outside the given window, or is no longer part of the playout) or if a new version of the EIT-Schedule event is received.

The EIT-Schedule module is preferably configured to create two different types of EIT-Schedule windows; a storage EIT-Schedule window and a monitor EIT-Schedule window. The storage EIT-Schedule window may be, for example, a representation of the EPG (Electronic Program Guide) window displayed on a television screen (i.e., same time/date and duration settings and same list of services). The EIT-Schedule module will acquire the EIT-Schedule events which fall within a storage EIT-Schedule window and store them in a system heap, as described below. An application or user can create handles to these events and use these handles to extract event information (e.g., descriptors, start time/date). If an application terminates, all handles to schedule events will be destroyed. The EIT-Schedule module will remove the associated window object and schedule event objects if they do not fall within another EIT-Schedule window.

The monitor EIT-Schedule window covers a time range and a list of services for which the EIT-Schedule module will acquire the EIT-Schedule events. The events acquired for the monitor EIT-Schedule window will be stored in an EIT-Schedule cache memory segment, rather than the system heap. Multiple applications or users may have handles to the same monitor EIT-Schedule window. If an application is terminated, all handles will be destroyed. However, the EIT-Schedule module will not remove the associated window object. The EIT-Schedule module will continuously update the created EIT-Schedule window regardless of what application is active. Table 1 below summarizes the major differences between storage and monitor EIT-Schedule windows.

TABLE 1

| Description | Storage EIT-Schedule window | Monitor EIT-Schedule window |
| --- | --- | --- |
| Application (not user) needs special rights to create or modify | N | Y |
| Handle to EIT-Schedule events can be created via the EIT-Schedule windows handle | Y | N |
| EIT-Schedule window will be destroyed when application or user terminates | Y | N |
| EIT-Schedule events have to pass content discriminator before they are stored | Y | N |
| Multiple handles can point to the same EIT-Schedule window | N | Y |
| Sorting can be done on the events of the BIT-Schedule window | Y | N |

When an application or user first creates an EIT-Schedule window, the EIT-Schedule module will check through its already acquired list of EIT-Schedule events to see if they fall within the window. The module will also determine if additional segments or sections are required to obtain every possible schedule event which may fall within the window. If required, the EIT-Schedule module will instruct a segment manager to acquire a specific segment or section. When new EIT-Schedule events which fall into a storage EIT-Schedule window are received, the EIT-Schedule module notifies the owner of the window of this new condition. For example, the owner may be notified when the following conditions occur: EIT-Schedule events are received and are ready for further processing, however, not all events have been received; the last EIT-Schedule event which falls within the window has been received; or the EIT-Schedule module ran out of memory and cannot store all EIT-Schedule events.

Figure 7:
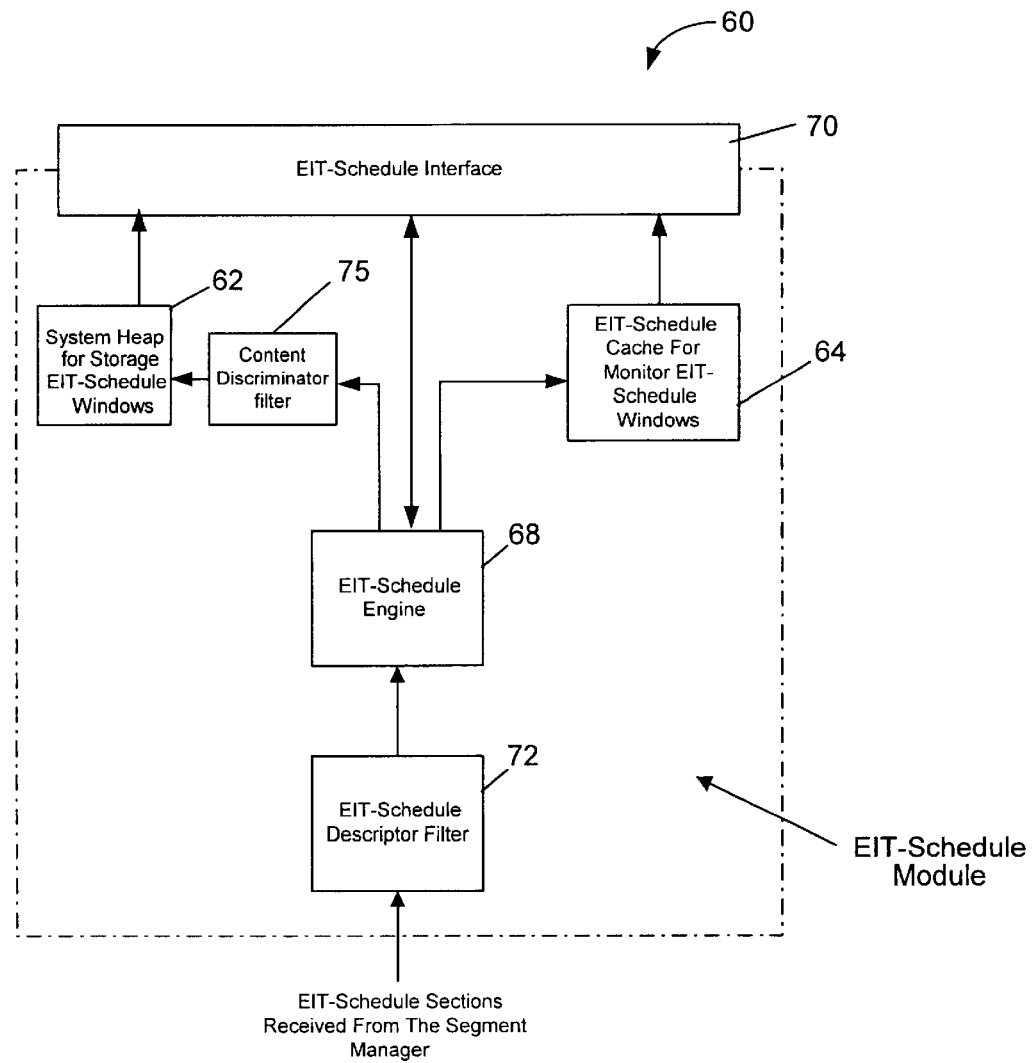
FIG. 7 is a block diagram illustrating an EIT-Schedule module of the present invention.

FIG. 7 is a block diagram illustrating the EIT-Schedule module 60. The EIT-Schedule module 60 acquires, processes, and stores EIT-Schedule events. The module includes an EIT-Schedule database which stores the EIT-Schedule events and its associated control structures and an EIT-Schedule engine 68. The database is comprised of system heap memory 62 for storage EIT-Schedule windows and EIT-Schedule cache 64 for monitor EIT-Schedule windows. During initialization, the EIT-Schedule engine 68 will receive a segment of memory (EIT-Schedule cache) which it will use to store the information of EIT-Schedule events which fall within a monitor EIT-Schedule window. All control structures and information of EIT-Schedule events, which do not fall within a monitor EIT-Schedule window but do fall within a storage EIT-Schedule window, will be stored in the system heap, assuming the heap has enough memory available to store the data. The EIT-Schedule module 60 further includes an EIT-Schedule interface 70 for communication with an application and an EIT-Schedule descriptor filter 72, and a content discriminator filter 75 described below.

The EIT-Schedule window defines a list of services and start time/date duration for which the EIT-Schedule events will be continuously monitored and stored (in the EIT-Schedule cache 64 for monitor windows or system heap 62 for storage windows) and managed by the EIT-Schedule engine 68. The monitoring of this list of services will be carried on by the EIT-Schedule engine 68 regardless of which application is running. Therefore, the EIT-Schedule cache 64 will not be cleared when the application terminates. However, EIT-Schedule event information which does not reside in the EIT-Schedule cache will be cleared when an application terminates. If an application requires more application memory than it has available, the EIT-Schedule cache 64 can be given to the application. The information contained within the EIT-Schedule cache 64 will be destroyed in the process and the EIT-Schedule engine 68 will stop monitoring for EIT-Schedule events which fall within a monitor EIT-Schedule window. However, the setup information of the EIT-Schedule windows will not be destroyed. Once the application terminates, the EIT-Schedule cache 64 is given back to the EIT-Schedule engine 68 which will again start to monitor EIT-Schedule events which fall inside a monitor EIT-Schedule window.

If the EIT-Schedule engine 68 tries to use more storage than is available in the system heap 62, the EIT-Schedule engine will preferably discard the EIT-Schedule event information and send a message to the current application. If the EIT-Schedule engine 68 tries to use more storage than is available in the EIT-Schedule cache 64, the EIT-Schedule engine will discard the EIT-Schedule event information and store this condition in a status flag. An application may query this status flag.

When an application requests EIT-Schedule event information, the EIT-Schedule engine 68 checks first in the EIT-Schedule database to see if the information is available. If the information is available and stable (e.g., not in the process of being updated), the application will have immediate access to the data. However, if the requested information is not available, the EIT-Schedule engine 68 will instruct a segment manager to acquire the data from the playout. Once the information is stored in the EIT-Schedule database (EIT-Schedule cache or system heap) the application is notified. The application can then access the stored EIT-Schedule event information.

An application may also be able to stop and restart the EIT-Schedule engine 68. If the EIT-Schedule engine 68 is stopped, all information stored in the EIT-Schedule database will be removed. However, the EIT-Schedule engine preferably remembers the last setting of the EIT-Schedule window and uses a start command to reacquire the EIT-Schedule event information with these last settings. An application may make EIT-Schedule event requests for any known service. If the requested EIT-Schedule event information is already part of an EIT-Schedule window and is already stored in the EIT-Schedule database, the application has instant access to the information. However, if the requested EIT-Schedule event information is not already stored in the EIT-Schedule database and no similar request is pending, the EIT-Schedule engine 68 will acquire the information from the playout and store it in system heap memory 62. The application will be notified once the EIT-Schedule event information is stable. If the application terminates or releases the handle pointing to the requested EIT-Schedule event and this event is not part of any other EIT-Schedule window, all event information will be removed from the EIT-Schedule database. However, if the resource pointed to an EIT-Schedule event which is part of another EIT-Schedule window then the event information will not be removed.

A request for an EIT-Schedule section from the EIT-Schedule engine 68 will be sent to an EIT-Schedule segment manager which collects data from the broadcast. The EIT-Schedule segment manager is in charge of retrieving DVB segments from the broadcast. It will issue commands to a demux section filter to collect specific sections from the broadcast. Once the demux section filter has received an entire section it will notify the segment manager. A notify routine is used to send a message to the segment manager indicating that the section is ready to be processed. The segment manager receives the message and pre-processes (e.g., version check, section already received) the attached section. Due to the fact that EIT-Schedule sections may be received with a high bit rate, it is possible that the sections are received faster then the segment manager can process the messages sent via the notify routine. Therefore, in order to control the acquisition rate of the EIT-Schedule sections, the segment manager preferably allows only a limited number of EIT-Schedule sections to wait for further processing in the segment manager's message queue. If this limit has been reached the segment manager does not allow any further notifications of EIT-Schedule sections. However, if an EIT-Schedule section is rejected based on the limit, the demux section filter will continue to acquire EIT-Schedule sections.

Once all requested EIT-Schedule sections are received, the segment manager continues to monitor EIT-Schedule sections for version changes. In order to reduce processing time, the demux section filters are preferably switched off after all requested sections have been received and enabled only periodically to monitor the EIT-Schedule sections for version changes. For example, after a time delay (e.g., five minutes) the segment manager may enable the demux section filters and monitor the EIT-Schedule sections. If no version change is detected the demux section filters will again be disabled for a period of time. The time delay value may be specified during initialization of the set top box 28, for example.

Figure 8:
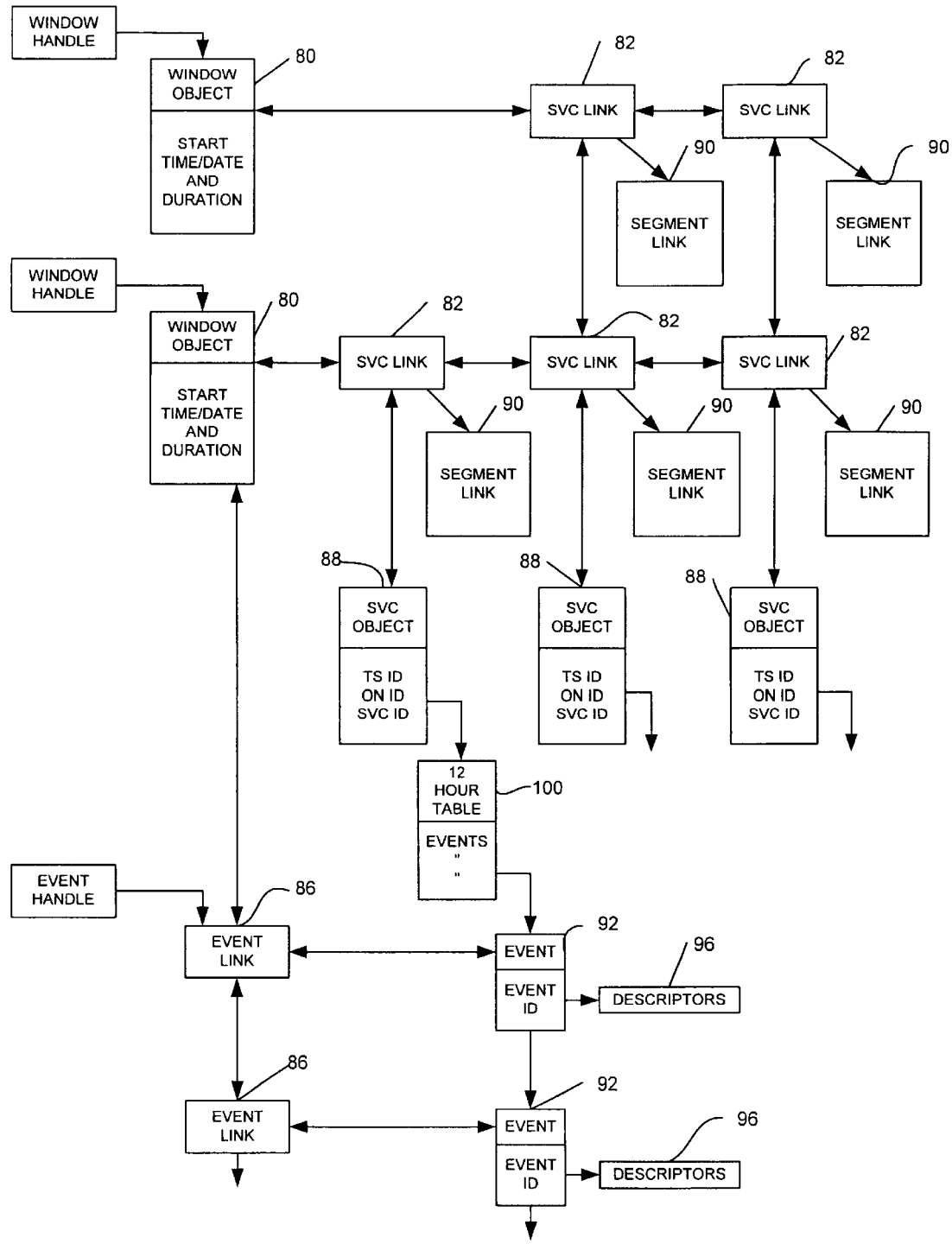
FIG. 8 is a diagram illustrating a database structure used to create the EIT-Schedule window.

FIG. 8 illustrates an example of a database structure for use with the EIT-Schedule module. A window object 80 points to a list of services to monitor via service link elements 82. The window object 80 includes, for example, start time, duration, pointer to the first service link element 82 of the list, pointer to the next window object, and pointer to the first event link elements and other window control information. The event link element 86 points to the next event link element in the list, the previous event link element in the list, the window object 80 to which it belongs, the next event link element in the list of the event link elements sharing the same event object, and the event object 92 from which it is referenced.

The service link element 82 links a service object 88 of the same window and a request for the same service. This allows access to all requests for a given service and all requests for the same time window. The service link element 82 belongs to only one window. The service link element 82 points to the segment list 90 which contains the list of segments already acquired or still pending for a service and window. The service link element 82 also points to the next service links elements for the same service, to the window object 80, to its related service object 88, to the next scheduled service of its window, and to the segment list 90 of the service and window.

The service object 88 contains the transport stream ID, original network ID, and service ID of the service for which EIT-Schedule events will be acquired. The service control structure is used as an entry point to the individual EIT-Schedule events. The service object 88 points to the service link element 82 and a half-day table 100. The half-day table (12 hour table) 100 is used to group schedule events within a twelve hour bracket for faster searches. The half-day table 100 points to the beginning of the first schedule event 92. The event object 92 contains the event ID of the EIT-Schedule events and stores its descriptors 96. Event objects which have the same transport stream ID, original network ID, and service ID are linked linearly to the half-day table 100. The sequence of the link is determined by the start time/date of the event (chronological order). The event object 92 includes, for example, start time, duration, and event ID. The event object 92 includes a pointer to the next event object belonging to the same half-day table entry, to its event link element 86, and to descriptor object 96.

The descriptors 96 are used to describe an individual EIT-Schedule event. The EIT-Schedule engine 68 preferably includes a descriptor filter routine so that events may be rejected or added by the engine. The descriptor filter routine allows an operator to parse the EIT-Schedule event's descriptor list before storage in the EIT-Schedule database. The descriptor filter routine may make a decision, based on requirements from the operator (e.g., language, country code of set top box) to either store a descriptor as is, modify the descriptor before storage, or reject the descriptor. The operator will also have the option to change the descriptor sequence in the descriptor list. The descriptor filter routine is preferably called once per EIT-Schedule event.

The system may also include an event content filter 75 (FIG. 7). For example, an event content filter may be set to "Arts/Culture" or "Movie/Drama". An event will then only be attached to a window if the event information describes such an event. As described above for the descriptor list, a content filter may be provided to convert content descriptor names provided by an operator to those recognized by the EIT-Schedule engine 68. The filter preferably includes filter rules (e.g., "OR", "AND", "NOT") which will allow an application to specify a set of expected content descriptions within an EIT-Schedule event descriptor list. For example, a rule string may include "Sport AND NOT Winter sport." This command allows any EIT-Schedule event describing a sport event, except winter sport, to pass through the event content filter. Only schedule events which pass through the content filter will be attached to the specific window.

Figure 9:
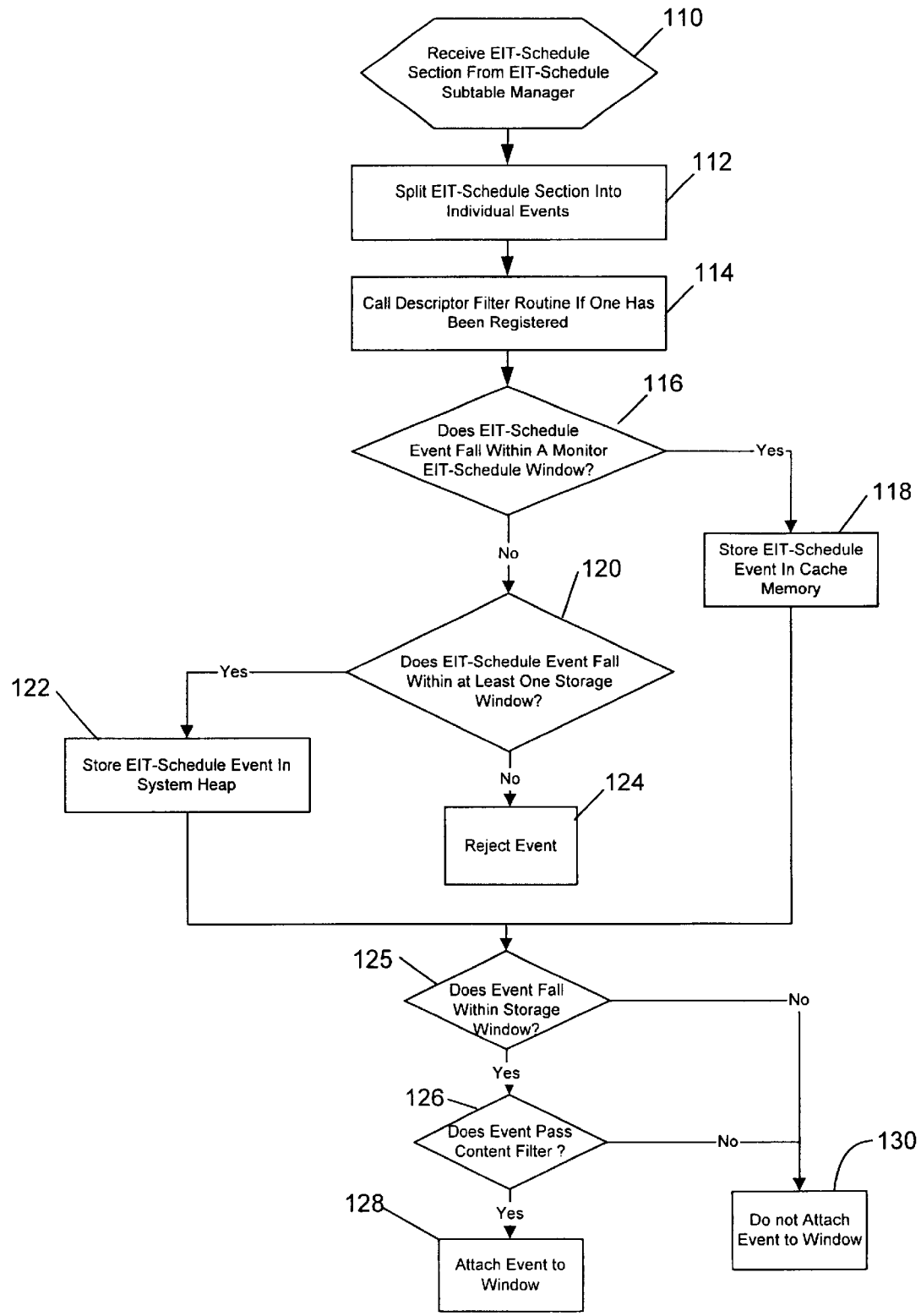
FIG. 9 is a flowchart illustrating the flow of an EIT-Schedule section into an EIT-Schedule database and from there to an application.

FIG. 9 illustrates graphically the flow of an acquired EIT-Schedule section into the EIT-Schedule database and from there to an application. At step 110 the EIT-Schedule section is received from the segment manager. At step 112 the EIT-Schedule section is split into individual events. If a descriptor filter routine was previously registered the routine is called at step 114. If the EIT-Schedule event falls within a monitor EIT-Schedule window the event is stored in the EIT-Schedule cache 64 (step 116 and 118). If the EIT-Schedule event does not fall within a monitor EIT-Schedule window the event is stored in the system heap 62 if it falls within a storage window (steps 116, 120, and 122). Otherwise, the event is rejected (step 124). Afterwards the EIT-Schedule engine checks for each storage window if the event falls within the storage window (step 125). If it falls within the window, it must pass through the window content filter (step 126). Only if these constraints are met will the event be attached to the storage window (step 128). If the event does not pass through the content filter for a window, it is not attached to the window (step 130). An application can now request event information on the schedule event attached to the storage window.

The above described methods may be implemented in a computer program product having computer codes that perform the various steps of the methods. The computer codes are preferably stored in a computer readable medium, such as CD-ROM, zip disk, floppy disk, tape, flash memory, system memory, hard drive, and data signal embodied in a carrier wave, such as over a network.

Although the present invention has been described in accordance with the embodiments shown, one of ordinary skill in the art will readily recognize that there could be variations made to the embodiment without departing from the scope of the present invention. Accordingly, it is intended that all matter contained in the above description and shown in the accompanying drawings shall be interpreted as illustrative and not in a limiting sense.

What is claimed is:

1. A method for acquiring and storing schedule event information in an interactive television system, the schedule event information including events and a start time and date for each of the events, the method comprising:
   creating a window defined by a start time and date, an end time and date, and a list of one or more services;
   receiving schedule event information corresponding to a plurality of events;
   identifying a subset of said plurality of events which correspond to said window;
   storing schedule event information for only the identified subset of events; and
   automatically moving said window forward relative to the start time and date at a specified interval;
   wherein automatically moving said window forward comprises moving said window when an interval between a current time and a time when the window was created is equal to a specified time interval.

2. The method of claim 1 wherein the schedule event information further includes a duration for each of said events, and wherein storing the schedule event information comprises storing the schedule event information for events having a duration within said window.

3. The method of claim 1 wherein automatically moving said window forward comprises moving said window at a time corresponding to a GMT date roll over.

4. The method of claim 1, wherein said window is a monitor window, and wherein said method further comprises:
   creating a storage window which identifies one or more events; and
   storing schedule event information for events which do not fall within the monitor window, but which do fall within the storage window.

5. The method of claim 4, wherein information for events which fall within the monitor window is stored within a system heap memory, and wherein information for events which do not fall within the monitor window, but which do fall within the storage window is stored in a cache.

6. The method of claim 1, further comprising filtering one or more event descriptors such that only information corresponding to events with selected descriptors is stored.

7. The method of claim 1, further comprising filtering event content such that only information corresponding to events with selected content is stored.

8. The method of claim 1 further comprising receiving the event schedule information at a receiving station.

9. The method of claim 1 wherein automatically moving said window comprises moving said window such that the end time and date of said window are always after a current time and date.

10. The method of claim 1 wherein creating a window comprises creating a window with an application.

11. A system for acquiring and storing schedule event information in an interactive television system, the schedule event information including events and a start time and date for each of the events, the system comprising:
   a processor configured to:
      create a window defined by a start time and date, an end time and date, and a list of one or more services;
      receive schedule event information corresponding to a plurality of events;
      identify a subset of said plurality of events which correspond to said window;
      store schedule event information for only the identified subset of events; and
      automatically move said window forward relative to the start time and date at a specified interval;
      wherein automatically moving said window forward comprises moving said window when an interval between a current time and a time when the window was created is equal to a specified time interval;
   a memory device for storing said schedule event information.

12. The system of claim 11 wherein the schedule event information further includes a duration for each of said events, and wherein said memory stores the schedule event information for events having a duration within said window.

13. The system of claim 11 further comprising an event descriptor filter operable to filter events such that only information corresponding to events with selected descriptors are stored.

14. The system of claim 11 further comprising an event content filter operable to filter events such that only information corresponding to events with selected content are stored.

15. The system of claim 11 further comprising a receiver for receiving the schedule event information.

16. The system of claim 11, wherein said window is a monitor window, and wherein said processor is further configured to:
   create a storage window which identifies one or more events; and
   store schedule event information for events which do not fall within the monitor window, but which do fall within the storage window.

17. A computer program product for acquiring and storing schedule event information in an interactive television system, the schedule event information including events and a start time and date for each of the events, the product comprising:

computer code that creates a window defined by a start time and date and an end time and date;

computer code that stores the schedule event information for events having a start time and date within said window;

computer code that automatically moves said window forward relative to the start time and date at a specified interval; and a computer readable medium that stores the computer code;

wherein said window is automatically moved forward based on a time interval between the current time and date and a time and date that said window was created.

18. The computer program product of claim 17 wherein the window is further defined by a list of services that carry a portion of the events.

19. The computer program product of claim 17 wherein said window is a monitor window, and wherein the computer program product further comprises:

computer code that creates a storage window which identifies one or more events; and computer code that stores schedule event information for events which do not fall within the monitor window, but which do fall within the storage window.

20. The computer program product of claim 17 wherein said window is automatically moved forward based on a GMT date roll over.

\* \* \* \* \*